Figures 1, 1A:
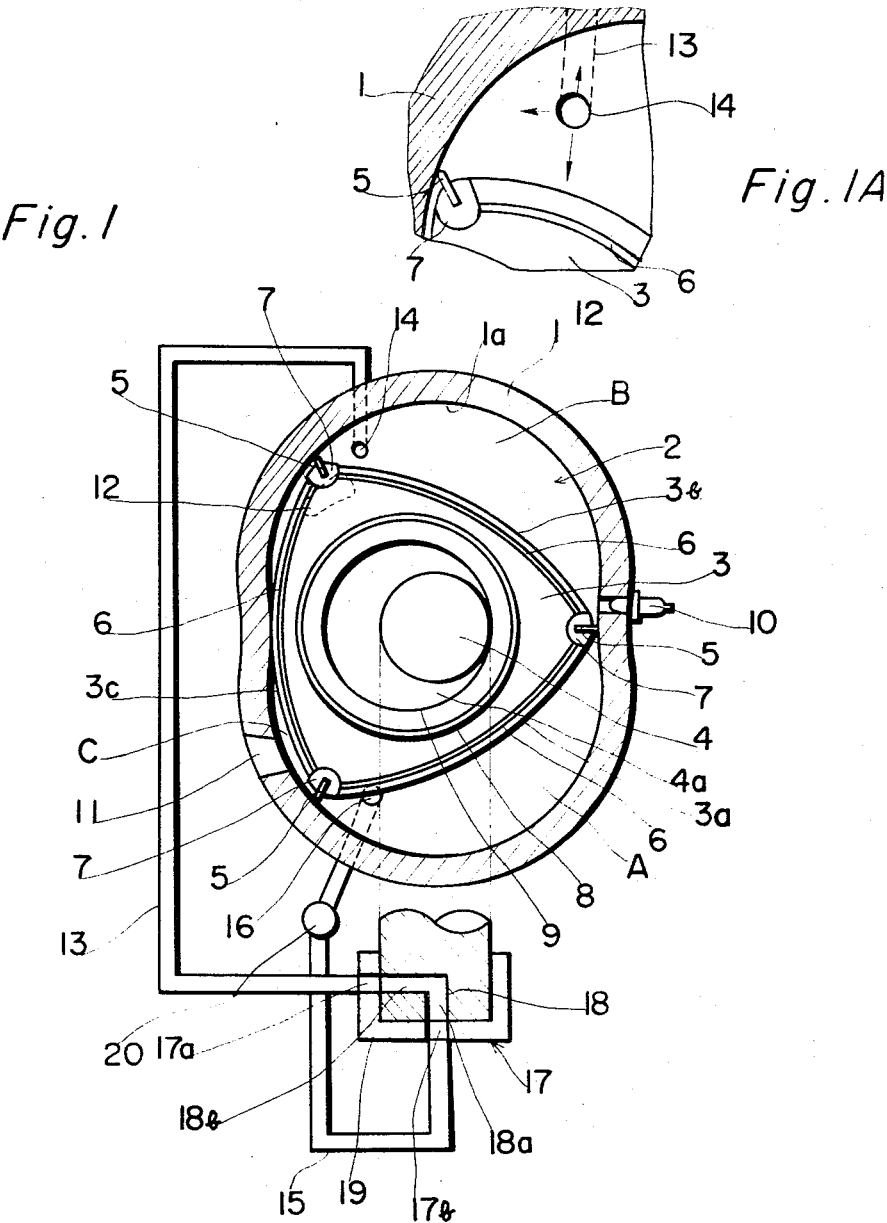

United States Patent [19]
Shimizu

[11] 3,783,839
[45] Jan. 8, 1974

[54] ROTARY PISTON ENGINE WITH EXHAUST RECIRCULATING DEVICE

[75] Inventor: Hiroshi Shimizu, Hiroshima, Japan

[73] Assignee: Toyo Kogyo Co., Ltd., Hiroshima-ken, Japan

[22] Filed: Dec. 16, 1971

[21] Appl. No.: 208,746

[30] Foreign Application Priority Data
Dec. 21, 1970 Japan.............................. 45/116179

[52] U.S. Cl................ 123/8.45, 60/278, 123/119 A
[51] Int. Cl........................................... F02b 53/06
[58] Field of Search.................. 123/8.01, 8.13, 8.45, 123/119 A; 60/39.52, 278

[56] References Cited
UNITED STATES PATENTS

| | | | |
|---|---|---|---|
| 3,168,078 | 2/1965 | Lamm................................. | 123/8.13 |
| 3,682,151 | 8/1972 | Tatsutomi........................ | 123/119 A |
| 3,636,934 | 1/1972 | Nakajima et al................ | 123/119 A |

Primary Examiner—Carlton R. Croyle
Assistant Examiner—Michael Koczo, Jr.
Attorney—Craig, Antonelli & Hill

[57] ABSTRACT

A rotary piston internal combustion engine provided with an exhaust recirculating device for effecting the reduction of both the nitrogen oxide content and the noxious unburned compounds present in the automobile exhaust gas and concurrently improving the engine power output with efficient fuel consumption by recirculating a portion of the exhaust gas from the engine working chamber under the power stroke to the engine working chamber under the compression stroke in response to the rotation of the power output shaft.

23 Claims, 4 Drawing Figures

ROTARY PISTON ENGINE WITH EXHAUST RECIRCULATING DEVICE

The present invention relates to an improvement in rotary piston internal combustion engines and, more particularly, to an improved internal combustion engine of this type wherein an exhaust recirculating device is disposed for recirculating a portion of the exhaust gas into the compression chamber.

Current public attentions are centered on the air pollution problem and an exhaust gas emerging from an exhaust system of an automobile is considered one of the most significant sources of atmospheric pollution in many cities of the world. Nevertheless, the automobile exhaust gas is composed of various kinds of chemical compounds and, of them, carbon monoxide, hydrocarbon and nitrogen oxide are major constituents as have been largely admitted.

It is generally well recognized that the amount of carbon monoxide and/or hydrocarbon present in the exhaust gas produced by the rotary piston internal combustion engine is somewhat greater than or substantially equal to that produced by the reciprocating piston internal combustion engine, whereas the amount of nitrogen oxide present in the exhaust gas produced by the rotary piston internal combustion engine is smaller than that produced by the reciprocating piston internal combustion engine. On the other hand, the current technological level is such that elimination of reduction of the carbon monoxide and/or hydrocarbon contents can be easily achieved by the provision of a catalitic converter and/or thermal reactor (afterburner) for purifying the exhaust gas while that of the nitrogen oxide content is difficult and, if not difficult, limited.

As is well known to those skilled in the art, the typical model of rotary piston engine in which the power output is produced by the planetary motion of a rotary piston within a housing comprises a housing structure having axially spaced end walls and a peripheral wall interconnecting the end walls to form a cavity therebetween, and a triangular or other shaped multi-sided rotary piston rotatably mounted in said cavity and coaxially journalled with and on an eccentric portion of a shaft which extends axially through the center of the cavity and coaxially journalled in the end walls of the housing to produce planetary motion of the rotary piston during rotation of the shaft. The peripheral wall has an epitrochoidal-shaped inner surface and has at least two circumferentially spaced lobes. In this rotary piston engine, the four cycles of intake, compression, power and exhaust are carried out simultaneously around the rotary piston when the engine is running. At this time, each of a plurality of working chambers respectively defined between arcuate flanks of the shaped rotary piston and the epitrochoidal-shaped inner surface of the peripheral wall within the cavity is successively conditioned in the intake, compression, power and exhaust strokes and varys in volume as the shaped rotary piston undergoes the planetary motion.

In the conventional rotary piston engine of the above construction, the atomized fuel-air mixture that has been introduced into one of the working chambers conditioned in the intake stroke has a tendency to be, because of the mass of fuel such as gasoline and the particular shape of the working chamber, separated into fuel and air at the rear or trailing zone of the working chamber at the time and after said working chamber has become conditioned in the compression stroke, whereby the mixture ratio is differentiated between the trailing zone and the leading zone within the working chamber in such a way that said ratio at the trailing zone is relatively greater than that at the leading zone. This hampers instantaneous perfect combustion of the mixture during the next succeeding power or combustion stroke in view of the fact that a development of combustion during the ignition is retarded at the trailing zone in which the richer mixture is accumulated. Accordingly, not only the power output of the engine is reduced, but also a somewhat greater amount of fuel is wasted, as compared with those afforded by the reciprocating piston engine.

To eliminate the nitrogen oxide content in the exhaust gas, it has been recently proposed to provide the automobile exhaust recirculating device in the rotary piston engine, by which a portion of the exhaust gas is recirculated into the intake manifold or the intake port of the engine. In this case, there can be found a disadvantage in that, as that portion of the exhaust gas is supplied to the intake manifold or the intake port of the engine, the flow of the effective mixture from a source of the mixture to the combustion chamber has a tendency to be hampered in such a way that a portion of the effective mixture which corresponds to the amount of the exhaust gas thus recirculated is sacrificed, i.e., can not be supplied. This badly affects the volumetric efficiency.

Accordingly, one essential object of the present invention is to provide an improved rotary piston internal combustion engine having an exhaust recirculating device by which the fuel-air mixture that has been supplied to the working chamber in the compression stroke can be uniformly distributed so that the combustion efficiency and, therefore, the power output of the engine can be substantially improved without the mixture consumed so much as has been heretofore required.

Another object of the present invention is to provide an internal combustion engine of the above type having an exhaust recirculating device by which the amounts of the nitrogen oxide content generally present in the exhaust gas can be reduced to an appreciable value smaller than that emitted from the conventional rotary piston internal combustion engine.

A further object of the present invention is to provide an internal combustion engine of the above type having an exhaust recirculating device by which a reduction of the volumetric efficiency can be eliminated to improve the power output of the engine.

A still further object of the present invention is to provide an internal combustion engine of the above type having an exhaust recirculating device which can be manufactured at low cost with simplified structure and which can be installed in the conventional engine of this kind.

According to the present invention, a portion of the exhaust gas of the rotary piston internal combustion engine is circulated from one of the working chambers, which is conditioned in the power stroke into another one of the working chambers which is conditioned in the compression stroke, by the effect of the pressure differential between said two working chambers. To determine the timing of supply and the amount of that portion of the exhaust gas to be circulated into the working chamber conditioned in the compression stroke, means is also provided for valving the connection between said working chamber under the power stroke and the working chamber under the compression stroke. In the preferred embodiment of the present invention, this valving means is adapted to operate in response to the rotation of the output shaft of the engine.

Figure 2:
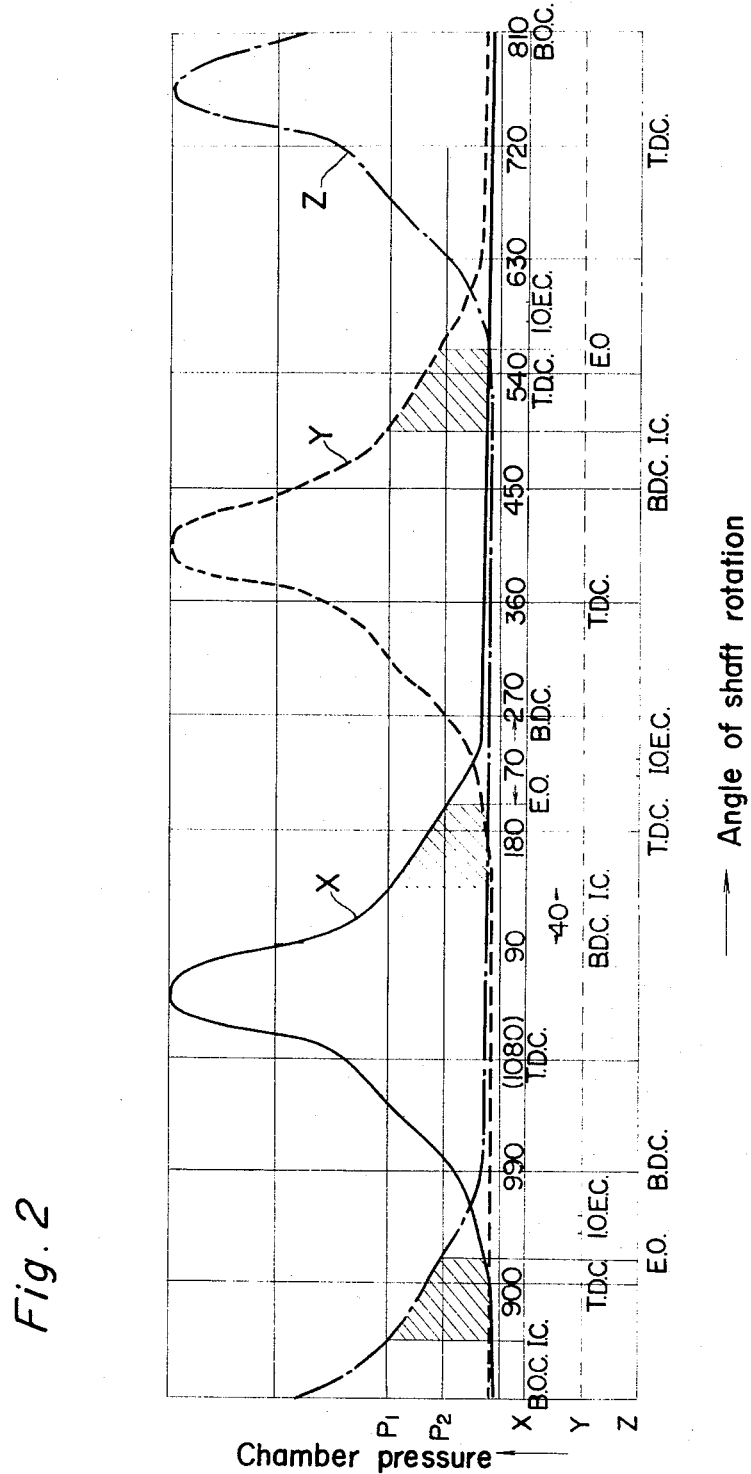
Figure 3:
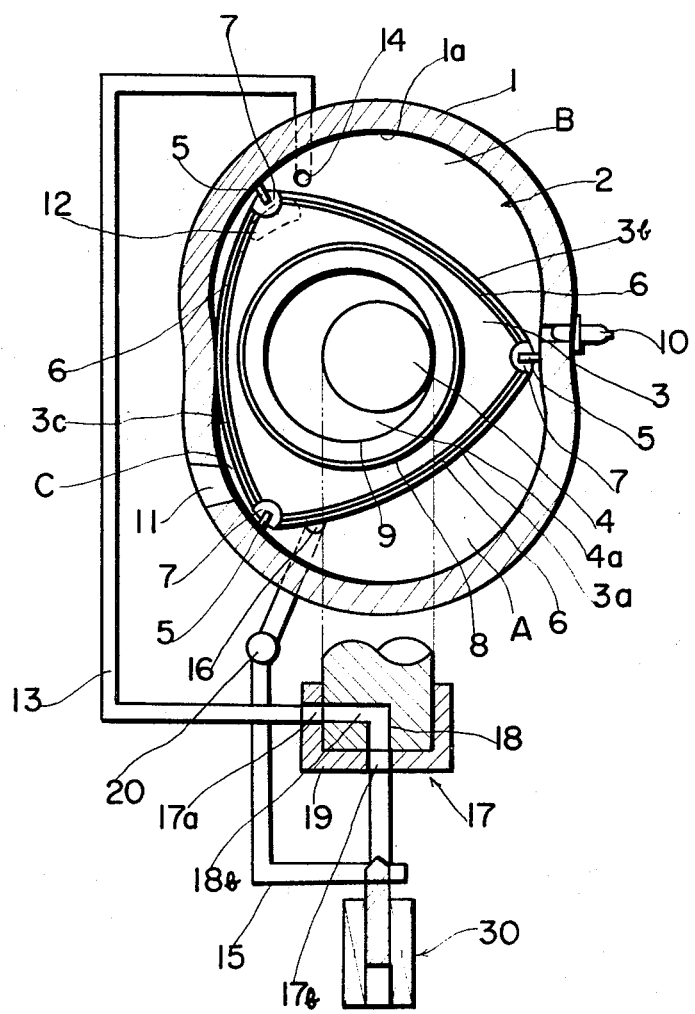

These and other objects and features of the present invention will become apparent from the following description thereof made in conjunction with preferred embodiments thereof shown in the accompanying drawings, in which;

FIG. 1 is a side elevation of the mechanism in one embodiment of the present invention with one end wall of the engine housing being removed to show the rotary piston position therein, FIG. 1A is an enlarged fragmentary view of FIG. 1, FIG. 2 is a performance curve showing variations in pressure in the working chambers of the rotary piston internal combustion engine, which is used to illustrate the operation of the present invention, and FIG. 3 is a similar view to FIG. 1, showing another preferred embodiment of the present invention.

Before the description of the present invention proceeds, it is to be noted that like parts are designated by like reference characters throughout the several views of the accompanying drawings. In addition, although the present invention will be hereinafter described in conjunction with the engine having a single rotary piston, it is to be noted that the present invention can be applicable to the engine having two or more rotary pistons as well.

Referring now to FIG. 1, a rotary piston internal combustion engine as shown includes a peripheral housing 1 having an epitrochoidal inner surface. A pair of side walls is disposed on the both sides of the peripheral housing 1, only one of which is shown and indicated by 2. A rotary piston 3 formed with three arcuate flanks and forming a triangle in cross-section is rotatably supported by an eccentric portion 4a of a power output shaft 4 and rotates under planetary motion within the cavity defined by the peripheral housing 1 and the side walls. Apex seals 5, and side seals 6 and 7 maintain a plurality of working chambers in the airtight condition, said working chambers being defined between the inner surface of the peripheral housing 1 and the arcuate flanks of the rotary piston 3 as the latter undergoes the planetary motion. An oil seal 8 is fixed to the rotary piston 3 in such a manner as to surround a central opening 9, of the diameter substantially equal to that of the eccentric portion 4a, so that oil can be prevented from leaking radially outwardly through the space between the side walls 2 and the rotary piston 3. The peripheral housing 1 is also formed with a small opening for accommodating therein an ignition plug 10. An exhaust port 11 for exhausting an exhaust gas therethrough to the outside of the housing 1 and an intake port 12 through which a fresh fuel-air mixture is supplied are, in the instance as shown, formed in the housing 1 and one of the side walls 2 in a suitably spaced relation with respect to each other, respectively.

The structural features of the rotary piston internal combustion engine so far described is well known to those skilled in the art and, therefore, the details are herein omitted. However, it is to be noted that the working chambers cyclically vary in volume during the planetary motion of the rotary piston 3 for the performance of a series of intake, compression, power or combustion and exhaust stroke as is also known to those skilled in the art.

The present invention is directed to the connection between one of the working chambers, which is conditioned in the power stroke, to another one of the working chambers which is conditioned in the compression stroke, namely, between the chamber A to the chamber B in the instance as shown. This connection includes a first passage 13 having one end connected with an exhaust gas inlet port 14 formed, for example, in the side wall 2 at a position corresponding to the trailing zone of the working chamber under the compression stroke, and a second passage 15 having one end connected with an exhaust gas outlet port 16 formed, for example, in the side wall 2 at a position corresponding to the leading zone of the working chamber under the power stroke and the other end connected with the other end of the first passage 13 through means for valving the connection between said first and second passages 13 and 15 in response to the rotation of the power output shaft 4. Disposed on the second passage 15 between said exhaust gas outlet port 16 and the valving means, generally indicated by 17, is a pressure control valve of suitable construction, the function of which will be mentioned later.

The valving means 17 is in the instance as shown composed of a passage 18 formed in a free end of the output shaft 4 which is remote from the other end thereof connected in an operative manner with a wheel driving shaft (not shown) through a suitable transmission (also not shown), and a cap-like bearing 19 having a peripheral wall of the inner diameter substantially equal to the diameter of the free end of the power output shaft 4 and a bottom portion rigidly connected with one end of the peripheral wall as shown.

The passage 18 formed in the free end of the power output shaft 4 includes a portion 18a axially extending through the center of said free end of said shaft 4 and another portion 18b extending at right angles to said first mentioned portion 18a. This passage 18 has one end connected with the adjacent end of the first passage 13 through a hole 17a formed in the peripheral wall of the cap-like bearing 19 in register therewith and the other end connected with the adjacent end of the second passage 15 through a hole 17b formed in the bottom portion of said bearing 19 in register therewith. The bearing 19 is fixed to a suitable rigid portion of the engine body or a suitable portion of a vehicle structure in any known manner while rotatably accommodating therein the free end of the power output shaft 4. It is to be noted that the second passage 15 is permanently connected with the passage 18, formed in the free end of the shaft 4, through the hole 17b formed in the bottom portion of the bearing 19.

This valving means 17 of the above construction is operable in response to the rotation of the power output shaft 4 in such a way that the connection between the first and second passages 13 and 15 can be established through the passage 18 each time the shaft 4 is rotated through a certain angle, the value of said angle being such that, each time the opening 16 that has been closed by the rotary piston 3 is opened, the flow of a portion of the exhaust gas from the working chamber under the power stroke to the working chamber under the compression stroke is permitted through said valving means.

The pressure control valve 20 disposed on the second passage 15 is of the type designed such as to regulate the pressure of the exhaust gas supplied thereto to a value slightly higher than the value of pressure exerted by the compression of the fuel-air mixture in the working chamber under the compression stroke, whereby not only the backflow of the mixture from the chamber under the compression stroke to the chamber under the power stroke can be prevented, but also a possible occurrence of considerable turbulence and vortex flow of the mixture in the chamber under the compression stroke which is attributable to the excessively high gas pressure can be prevented.

In constructing the device according to the present invention, care must be taken in the design of the exhaust gas inlet port 14 which is shown as formed in the end wall 2, but may be formed in the peripheral housing 1 at the corresponding position. In view of the fact that one of the essential features of the present invention resides in the adjustment of the enriched mixture at the trailing zone of the chamber under the compression stroke to a substantially proper ratio of fuel to air thereby to eliminate the unevenness of the mixture ratio within said working chamber, the port 14 is preferably oriented such that a portion of the exhaust gas supplied from the working chamber under the power stroke and emerging from said port 14 flows in the opposite directions at right angles relative to the axis of the power output shaft 4 and rearwardly with respect to the trailing zone of the working chamber under the compression stroke, substantially indicated by the arrows in an enlarged fragmentary view of FIG. 1. With this design, the mixture present at the leading zone of the chamber under the compression stroke can be advantageously prevented from leaning which may results from the supply of the exhaust gas into the chamber under the compression stroke.

The operation of the device according to the present invention will be hereinafter described with reference to FIG. 2 in combination with FIG. 1 and, in the course thereof, an attempt is made to clarify the operation of the valving means 17. As is well known to those skilled in the art, when the rotary piston internal combustion engine is running, the four cycles of a series of intake, compression, power and exhaust can be repeated a number of times during one planetary motion of the rotary piston. However, so far as a single working chamber defined within the housing cavity between each arcuate flank of the rotary piston and the inner surface of the peripheral housing is involved, the completion of the four cycles or one planetary motion results in rotation of the power output shaft through 1,080°. During the four cycles of the working chamber, the value of pressure present within said chamber varys such as shown in FIG. 2 wherein the axis of ordinate represents the pressure in the working chamber while the axis of abscissa represents the angle of rotation of the power output shaft 4 together with the timing of operation of various components of the rotary piston engine as defined below;

TDC: Piston 3 is in the Top Dead Center position.
EO: Exhaust port 11 is Opened.
BDC: Piston 3 is in the Bottom Dead Center position.
IO: Intake port 12 is Opened.
EC: Exhaust port 11 is Closed.
IC: Intake port 12 is Closed. and reference characters X, Y and Z given to the curves are assumed to represent respectively as follows;
X: Pressure variation within the working chamber defined between the flank 3a of the piston 3 and the inner surface 1a of the peripheral housing 1,
Y: Pressure variation within the working chamber defined between the piston flank 3b and the housing inner surface 1a, and
Z: Pressure variation within the working chamber defined between the piston flank 3c and the housing inner surface 1a.

With the above in mind, attention is first called to the pressure variation within the working chamber defined between the flank 3a of the piston 3 and the inner surface 1a of the peripheral housing 1.

As represented by the curve X, the pressure commences to increase from the minimum value upon closure of the intake port 12 at IC and thereafter increases. At TDC, the ignition plug 10 is operated to effect a combustion of the mixture contained in said chamber whereby the pressure can be rapidly increased to the maximum value and said working chamber has been brought into the power stroke. This power stroke continues until the exhaust port 11 is opened at EO at which time the chamber is brought into the exhaust stroke. However, it is to be noted that, in view of the fact that the exhaust port 11 is gradually opened to its full open position as is well known to those skilled in the art, the pressure at the time of opening of the port 11 remains at the value $P_2$ which is still higher than the minimum value. Then, the intake port 12 opens at IO to enter the working chamber, that has been conditioned in the exhaust stroke, into the intake stroke and the exhaust port 11 closes at EC to complete the exhaust stroke. Thus, it is clear that, during a series of intake, compression, power and exhaust strokes, the output shaft 4 can be rotated through 1,080° as hereinbefore described.

The pressure variations within the other working chambers defined between the piston flank 3b and the housing inner surface 1a and the piston flank 3c and the housing inner surface 1a, respectively, as represented by the curves Y and Z, are displaced in phase 360° and 720° respectively with respect to the pressure variations within the working chamber defined between the piston flank 3a and the housing inner surface 1a.

In practice, the chamber defined by the flank 3b is, so far as it is related with respect to the leading chamber defined by the flank 3a, in the intake stroke at the time when the chamber defined by the flank 3a is to be brought into the power stroke past TDC. The chamber defined by the flank 3b can be completely brought into the compression stroke upon closure of the intake port 12 at IC, during which the chamber defined by the flank 3a is still in the power stroke which will complete upon opening of the exhaust port 11. In this instance, the pressure within the chamber defined by the flank 3a is higher than that within the chamber defined by the flank 3b. In other words, the pressure within the chamber under compression stroke is lower than that within the chamber under power stroke. Accordingly, during this period, by the effect of pressure differential between these chambers respectively under the power and compression strokes, a portion of the exhaust gas can be supplied to the chamber under the compression stroke by means of the passage 15 and then the passage 13 through the valving means 17, the supply of that portion of the exhaust gas from the chamber under the power stroke to the chamber under the compression stroke being continued until the chamber under the power stroke is brought into the exhaust stroke, namely, until the time when the exhaust port 11 is opened, substantially as indicated by the hatching in FIG. 2.

At this time, since the temperature of the exhaust gas thus supplied is of a relatively higher value, the deposit of fuel wetted on the flank of the piston 3 and the inner surface 1a of the housing 1 which define the chamber under the compression stroke can be advantageously vaporized by the effect of said temperature. In addition, since the inlet port 14 is, of course, oriented such as hereinbefore described, the leaning of the mixture within the leading zone of the chamber under the compression stroke can also be advantageously eliminated.

In view of the foregoing, reduction of the engine power output can be prevented and, concurrently, emission of a considerable amount of noxious unburned compounds, as well as nitrogen oxide, present in the exhaust gas to the atmosphere can be prevented, even though a portion of the exhaust gas has been supplied in the manner as hereinbefore fully disclosed. Especially, the noxious unburned compounds can be more reduced if the thermal reactor or afterburner is operatively provided with the engine of the present invention.

In FIG. 3, another preferred embodiment of the present invention is shown. The structure of the engine shown in FIG. 3 is substantially the same as shown in FIG. 1 except for the provision of an electrically operated solenoid valve 30 of any suitable construction.

The solenoid valve 30 is operatively disposed on the second passage 15 at a position between the valving means 17 and the pressure control valve 20 for the purpose of preventing the mixture in the chamber under the compression stroke from being diluted during the engine warm-up or idling. This is because, during such period, the somewhat enriched mixture is recommended in the working chamber under the compression stroke to facilitate the start of the engine or stabilize the idling. Accordingly, this solenoid valve 30 is operable in such a manner that, only during this period, the passage 15 is cut off thereby.

Although the present invention has been fully described in connection with the preferred embodiments thereof, various changes and modifications are apparent to those skilled in the art. For example, the valving means 17 shown as formed in the free end of the power output shaft 4 in the foregoing embodiments may be replaced with another electrically operated solenoid valve capable of performing the same function as performed by said valving means. In this case, the electrically operated solenoid valve is preferably operated in response to the rotation of the shaft 4 as well. In addition, in view of the fact that the temperature of the exhaust gas is relatively higher, a cooling device may be disposed on the connection between the chambers respectively under the compression and power strokes thereby to reduce the temperature to a value proper to the chamber under the compression stroke.

What is claimed is:

1. A rotary piston internal combustion engine comprising a housing having spaced end walls and a peripheral wall between said end walls and having an epitrochoidal inner surface forming a cavity, said housing being formed with spaced intake and exhaust ports and an ignition plug extending through said housing at a point spaced there-around from said ports; a rotary piston having at least three side flanks and eccentrically rotatably mounted on a power output shaft within said cavity, said rotary piston having circumferentially spaced apexes and substantially flat end faces at opposite ends thereof, each of said apexes and flat end faces having sealing members slidably engaged with the inner surface of said housing to form between the rotary piston and the housing a plurality of working chambers, each of said working chambers being capable of varying in volume during the planetary motion of said rotary piston performing each four strokes of intake, compression, power and exhaust; connecting means connecting one of said working chambers, which is conditioned in the power stroke, to the trailing zone of another one of said working chambers, which is conditioned in the compression stroke; and a valving device disposed in said connecting means and operable in response to rotation of the power output shaft to supply a portion of exhaust gas present in said working chamber under the power stroke to said working chamber under the compression stroke in a predetermined timing by the effect of pressure differential between said two working chambers respectively under the power and compression strokes, thereby permitting re-mixing of the fuel-air mixture, that has been supplied to said working chamber under the compression stroke, with that portion of said exhaust gas for reducing the nitrogen oxide content present in the exhaust gas and improving an efficient fuel consumption with substantial increase of the engine power output.

2. A rotary piston internal combustion engine as claimed in claim 1, wherein said connecting means includes a first passage having one end open to the working chamber under the compression stroke, a second passage having one end connected with the other end of said first passage through said valving device and the other end open to the working chamber under the power stroke, and a pressure control valve disposed in one of said first and second passages for regulating the pressure of that portion of the exhaust gas permitted to flow through said passages.

3. A rotary piston internal combustion engine as claimed in claim 2, wherein said valving device is formed in a free end of the power output shaft.

4. A rotary piston internal combustion engine as claimed in claim 2, wherein one of said first and second passages includes another valving device operatively disposed thereon for preventing the supply of that portion of the exhaust gas during at least the engine warm-up period and the idling period even though said valving device designed to determine the amount of and the timing of the supply of that portion of the exhaust gas in response to the rotation of the power output shaft has been brought in the position to permit the flow of that portion of the exhaust gas therethrough.

5. A rotary piston internal combustion engine as claimed in claim 2, wherein said end of said first passage which is opened to the working chamber under the compression stroke is oriented such that the portion of the exhaust gas supplied thereto flows into the working chamber under the compression stroke in the opposite directions at right angles relative to the axis of the power output shaft and rearwardly with respect to a trailing zone of the working chamber under the compression stroke.

6. A rotary piston internal combustion engine comprising a housing having spaced end walls and a peripheral wall between said end walls and having an epitrochoidal inner surface forming a cavity, said housing being formed with spaced intake and exhaust ports and an ignition plug extending through said housing at a point spaced therearound from said ports; a rotary piston having at least three side flanks and eccentrically rotatably mounted on a power output shaft within said cavity, said rotary piston having circumferentially spaced apexes and substantially flat end faces at opposite ends thereof, each of said apexes and flat end faces having sealing members slidably engaged with the inner surface of said housing to form between the rotary piston and the housing a plurality of working chambers, each of said working chambers being capable of varying in volume during the planetary motion of said rotary piston performing each four strokes of intake, compression, power and exhaust; a first passage having one end open to one of said working chambers which is conditioned in the compression stroke; a second passage having one end open to another one of the working chambers which is conditioned in the power stroke; a pressure control valve disposed on said second passage for regulating the pressure of a portion of exhaust gas to be supplied from said working chamber under the power stroke to said working chamber under the compression stroke and a valving device for connecting said first and second passage and operable to permit the flow of said portion of said exhaust gas in a proper timing and in a suitable amount by the effect of pressure differential between said two working chambers under the power and compression stroke, whereby remixing of the fuel-air mixture that has been supplied to said working chamber under the compression stroke can be performed for reducing the nitrogen oxide content present in the exhaust gas and improving an efficient fuel consumption with substantial increase of the engine power output.

7. Exhaust gas recirculating apparatus for an internal combustion engine of the type having a rotary piston drivingly connected to an engine output shaft and rotatable within an engine housing in such a manner that a plurality of variable volume working chambers are formed between circumferentially spaced apices of said piston and inner surfaces of said engine housing, each of said working chambers being variable in volume during rotation of said piston to sequentially experience intake, compression, power and exhaust stroke conditions, each of said working chambers exhibiting a leading zone and a trailing zone delimited by respective adjacent apices of the piston in the direction of travel of the piston; said apparatus comprising connecting means for conducting a portion of the exhaust gases from a first of said working chambers which is experiencing a power stroke condition to a second of said working chambers which is experiencing a compression stroke condition, wherein said connecting means communicates with said second working chamber only by way of inlet means at a position corresponding to the trailing zone of said second chamber, whereby the inherently richer fuel to air mixture occurring in said trailing zone of said second chamber is diluted by the exhaust conducted from said first chamber to more uniformly distribute the fuel to air mixture in said second chamber with a consequent increase in efficiency of fuel consumption and engine power output while reducing the nitrogen oxide content present in the engine exhaust gases.

8. Apparatus according to claim 7, wherein said connecting means communicates with said first chamber at a position corresponding to the leading zone of said first chamber.

9. Apparatus according to claim 7, wherein said connecting means includes conduit means extending between said first and second chambers and a valving device for selectively opening and closing said conduit means, said valving device including means responsive to the rotational position of said engine output shaft and separate from any openings to said engine housing controlled directly by said piston for controlling the amount of and timing of the opening of said conduit means.

10. Apparatus according to claim 9, wherein said valving device includes passage means extending through a portion of said engine output shaft, one end of said passage means continuously communicating with a first part of said conduit means which is open to one of said first and second working chambers and the other end of said passage means selectively communicating with a second part of said conduit means which is open to the other of said first and second chambers in dependence on the rotational position of said engine output shaft.

11. Apparatus according to claim 10, wherein said first part of said conduit means is open to said second working chamber.

12. Apparatus according to claim 9, further comprising a pressure control valve disposed in said connecting means for regulating the pressure of the exhaust gases conducted between said first and second working chambers.

13. Apparatus according to claim 12, wherein said pressure control valve includes means for preventing backflow of gases through said connecting means from said second working chamber to said first working chamber.

14. Apparatus according to claim 10, further comprising a pressure control valve disposed in said connecting means for regulating the pressure of the exhaust gases conducted between said first and second working chambers.

15. Apparatus according to claim 9, further comprising a second valving device for closing said connecting means irrespective of the position of said first-mentioned valving device during certain engine operating conditions.

16. Apparatus according to claim 15, wherein said second valving device includes means for closing said connecting means during engine idling and warm-up conditions.

17. Apparatus according to claim 12, further comprising a second valving device for closing said connecting means irrespective of the position of said first-mentioned valving device during certain engine operating conditions.

18. Apparatus according to claim 17, wherein said second valving device includes means for closing said connecting means during engine idling and warm-up conditions.

19. Exhaust gas recirculating apparatus for an internal combustion engine of the type having a rotary piston drivingly connected to an engine output shaft and rotatalable within an engine housing in such a manner that a plurality of variable volume working chambers are formed between circumferentially spaced apices of said piston and inner surfaces of said engine housing, each of said working chambers being variable in volume during rotation of said piston to sequentially experience intake, compression, power and exhaust stroke conditions, each of said working chambers exhibitng a leading zone and a trailing zone delimited by respective adjacent apices of the piston in the direction of travel of the piston, said apparatus comprising connecting means for conducting a portion of the exhaust gases from a first of said working chambers which is experiencing a power stroke condition to a second of said working chambers which is experiencing a compression stroke condition, wherein said connecting means includes conduit means extending between said first and second chambers and a valving device for selectively opening and closing said conduit means, said valving device including means responsive to the rotational position of said engine output shaft and separate from any openings to said engine housing controlled directly by said piston for controlling the amount of and timing of the opening of said conduit means.

20. Apparatus according to claim 19, wherein said valving device includes passage means extending through a portion of said engine output shaft, one end of said passage means continuously communicating with a first part of said conduit means which is open to one of said first and second working chambers and the other end of said passage means selectively communicating with a second part of said conduit means which is open to the other of said first and second chambers in dependence on the rotational position of said engine output shaft.

21. Apparatus according to claim 20, further comprising a pressure control valve disposed in said connecting means for regulating the pressure of the exhaust gases conducted between said first and second working chambers.

22. Apparatus according to claim 19, further comprising a second valving device for closing said connecting means irrespective of the position of said first-mentioned valving device during certain engine operating conditions.

23. Apparatus according to claim 22, wherein said second valving device includes means for closing said connecting means during engine idling and warm-up conditions.

* * * * *